United States Patent
Yasuda

(10) Patent No.: US 7,995,016 B2
(45) Date of Patent: Aug. 9, 2011

(54) DISPLAY COMPRISING A PLURALITY OF DISPLAY PORTIONS

(75) Inventor: Hitoshi Yasuda, Mizuho (JP)

(73) Assignee: Sony Corporation, Tokyo (JP)

( * ) Notice: Subject to any disclaimer, the term of this patent is extended or adjusted under 35 U.S.C. 154(b) by 937 days.

(21) Appl. No.: 11/979,315

(22) Filed: Nov. 1, 2007

(65) Prior Publication Data

US 2008/0100777 A1      May 1, 2008

(30) Foreign Application Priority Data

Nov. 1, 2006   (JP) .................................. 2006-297309

(51) Int. Cl.
 *G09G 3/36*      (2006.01)
(52) U.S. Cl. .......................................... 345/87; 345/1.1
(58) Field of Classification Search ............... 345/1.1–4, 345/87–100, 204–215
See application file for complete search history.

(56) References Cited

U.S. PATENT DOCUMENTS

| 6,864,942 B2 * | 3/2005 | Hsieh ............................ 349/151 |
| 6,954,184 B2 | 10/2005 | Kurashima et al. |
| 7,330,173 B2 | 2/2008 | Kumada et al. |
| 7,471,261 B2 * | 12/2008 | Goto et al. ..................... 345/1.1 |
| 2005/0052340 A1 | 3/2005 | Goto et al. |

FOREIGN PATENT DOCUMENTS

| JP | 2005-156574 | 6/2005 |
| JP | 2005-283949 | 10/2005 |
| JP | 2006-031034 | 2/2006 |
| KR | 10-2006-0045763 | 5/2006 |

* cited by examiner

*Primary Examiner* — Vijay Shankar
(74) *Attorney, Agent, or Firm* — K&L Gates LLP

(57) ABSTRACT

This display includes a first display portion and a second display portion, a first signal line supplying a signal output from a driver circuit to the first display portion while partially serving also as a signal line for supplying another signal output from the driver circuit to the second display portion, a first switching circuit switching the signal supplied through the first signal line by time sharing and a second signal line for supplying the signal to the second display portion.

16 Claims, 7 Drawing Sheets

WHEN MAIN DISPLAY AND SUB DISPLAY ARE DRIVEN

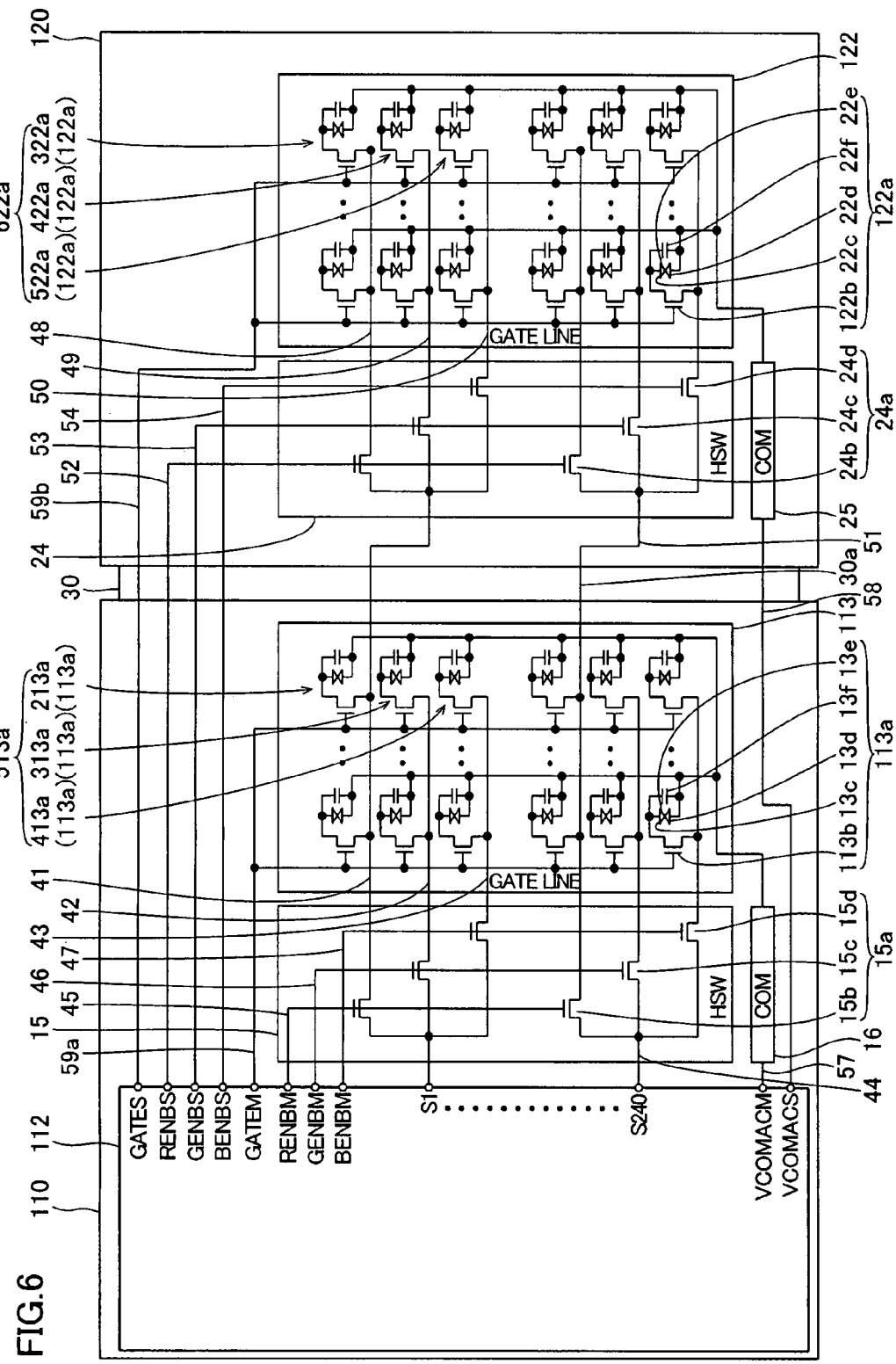

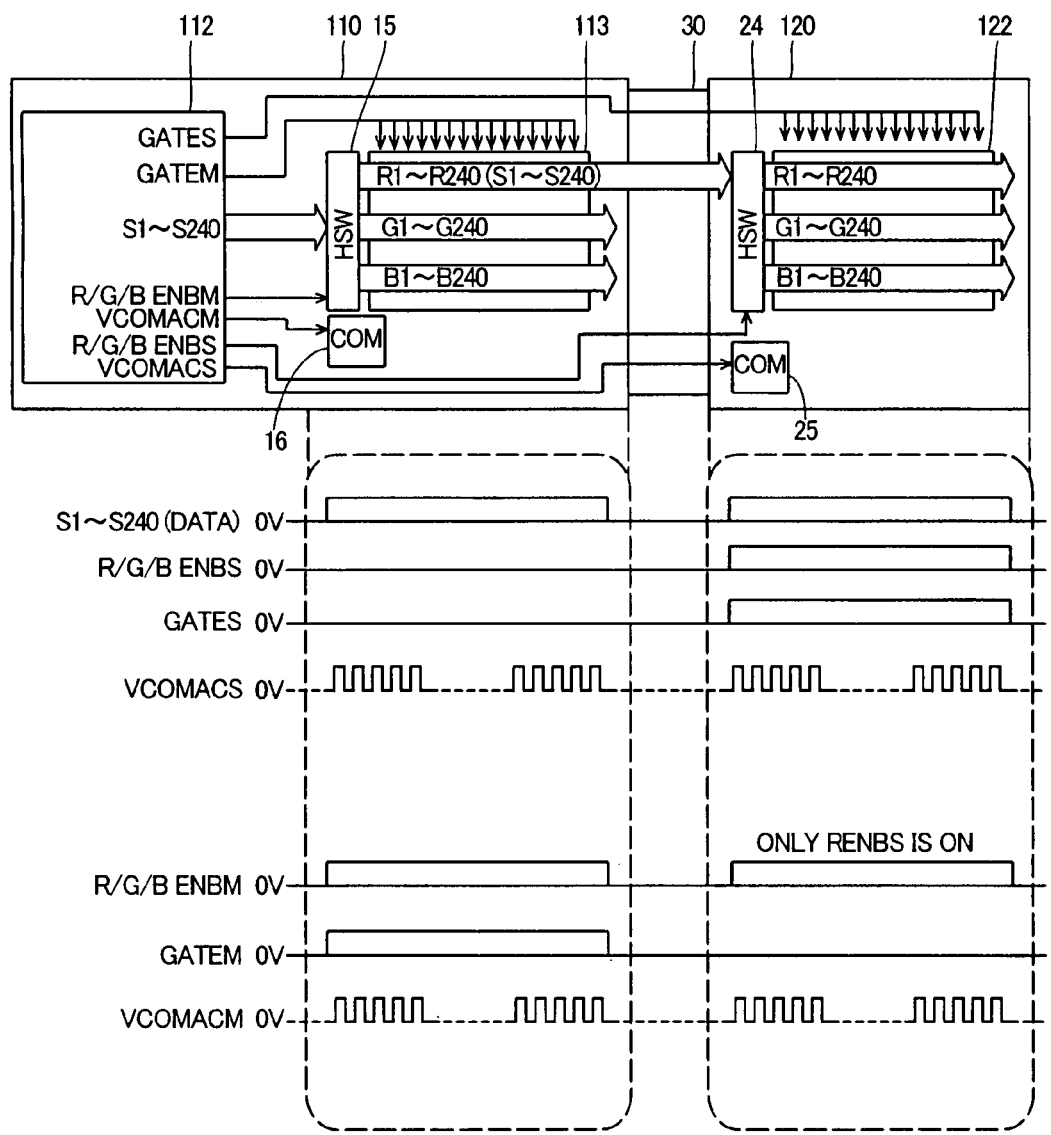

DISPLAY COMPRISING A PLURALITY OF DISPLAY PORTIONS

BACKGROUND OF THE INVENTION

1. Field of the Invention

The present invention relates to a display, and more particularly, it relates to a display comprising a plurality of display portions.

2. Description of the Background Art

A display comprising two display portions is known in general (refer to Japanese Patent Laying-Open No. 2006-31034, for example). The aforementioned Japanese Patent Laying-Open No. 2006-31034 discloses a liquid crystal device (display) comprising a main display (first display portion), a sub display (second display portion), a driver IC (driver circuit) and a wiring board for electrically connecting the main display and the sub display with each other. The wiring board of the liquid crystal device disclosed in Japanese Patent Laying-Open No. 2006-31034 is provided with wires for supplying image signals from the driver IC to the sub display through the main display.

In the conventional liquid crystal device disclosed in Japanese Patent Laying-Open No. 2006-31034, however, the wires are formed on the wiring board in response to the number of pixels in the sub display. If the sub display has a large number of pixels, therefore, the number of the wires formed on the wiring board is disadvantageously increased. Thus, the interval between the wires formed on the wiring board is so reduced that it is difficult to form the wires on the wiring board.

SUMMARY OF THE INVENTION

The present invention has been proposed in order to solve the aforementioned problem, and an object of the present invention is to provide a display capable of suppressing increase in the number of signal lines connecting display portions with each other when comprising a plurality of display portions.

In order to attain the aforementioned object, a display according to an aspect of the present invention comprises a first display portion, a second display portion, a driver circuit driving the first display portion and the second display portion, a plurality of first signal lines supplying a signal output from the driver circuit to the first display portion while partially serving also as a signal line for supplying another signal output from the driver circuit to the second display portion, a first switching circuit provided on the second display portion for switching the signal for the second display portion supplied through part of the first signal lines by time sharing and a plurality of second signal lines for supplying the signal for the second display portion switched by the first switching circuit to the second display portion.

As hereinabove described, the display according to this aspect of the present invention comprises the plurality of first signal lines partially serving also as a signal line for supplying the other signal output from the driver circuit to the second display portion, the first switching circuit provided on the second display portion for switching the signal for the second display portion supplied through part of the first signal lines by time sharing and the plurality of second signal lines for supplying the signal for the second display portion switched by the first switching circuit to the second display portion, whereby the number of the part of the first signal lines, provided on the first display portion, supplying the other signal to the second display portion can be reduced as compared with that of the second signal lines provided on the second display portion due to the first switching circuit, having the time-sharing function, provided on the second display portion. Thus, increase in the number of signal lines connecting the first and second display portions with each other can be suppressed also when the second display portion has a large number of pixels.

The display according to the aforementioned aspect preferably further comprises a wiring board for electrically connecting the first display portion and the second display portion with each other, while the wiring board preferably includes a plurality of third signal lines for supplying the signal for the second display portion supplied through part of the first signal lines to the first switching circuit. According to this structure, the number of the third signal lines included in the wiring board connecting the first and second display portions with each other can be reduced due to the first switching circuit, whereby the interval between the third signal lines included in the wiring board can be inhibited from reduction also when the second display portion has a large number of pixels. Consequently, the wiring board can be prevented from difficulty in formation of the third signal lines.

The display according to the aforementioned aspect preferably further comprises a second switching circuit provided on the first display portion for switching the signal output from the driver circuit by time sharing and supplying the switched signal to the first signal lines. According to this structure, the number of the signal lines for supplying the signal output from the driver circuit to the first display portion can be reduced due to the second switching circuit, having the time-sharing function, provided on the first display portion.

In the aforementioned structure having the first display portion including the second switching circuit, the number of signals resulting from time sharing by the first switching circuit provided on the second display portion is preferably identical to the number of signals resulting from time sharing by the second switching circuit provided on the first display portion. According to this structure, the same type of switching circuits can be employed as the first and second switching circuits, whereby the first and second switching circuits can be controlled by a common method. Thus, the circuit structure of the driver circuit controlling the first and second switching circuits can be simplified.

In the aforementioned structure having the first display portion including the second switching circuit, the number of signals resulting from time sharing by the first switching circuit provided on the second display portion is preferably greater than the number of signals resulting from time sharing by the second switching circuit provided on the first display portion. According to this structure, the first switching circuit time-shares a larger number of signals as compared with the second switching circuit, whereby the second display portion can be supplied with the signal through a smaller number of signal lines. Thus, increase in the number of signal lines can be further suppressed.

In the aforementioned structure having the first display portion including the second switching circuit, the display preferably further comprises a plurality of fourth signal lines for supplying a signal for controlling the first switching circuit from the driver circuit to the first switching circuit and a plurality of fifth signal lines for supplying another signal for controlling the second switching circuit from the driver circuit to the second switching circuit. According to this structure, the driver circuit can easily control the first and second switching circuits.

In the aforementioned structure having the first display portion including the second switching circuit, the driver circuit preferably controls the second switching circuit provided on the first display portion to supply the signal for the second display portion to part of the first signal lines while controlling the first switching circuit provided on the second display portion to switch the signal for the second display portion supplied through the part of the first signal lines and to supply the switched signal to the second signal lines when displaying image data on the second display portion. According to this structure, the signal for the second display portion can be easily supplied to the second signal lines due to the driver circuit, thereby easily driving the second display portion.

In the aforementioned structure having the first display portion including the second switching circuit, the second switching circuit preferably includes a plurality of switching portions corresponding to the plurality of first signal lines respectively, and the driver circuit preferably turns on only the switching portion of the second switching circuit corresponding to a partial first signal line included in the plurality of first signal lines when displaying image data on the second display portion. According to this structure, the first signal lines other than the partial first signal line for supplying the signal for the second display portion to the second display portion are turned off, whereby the driver circuit can reliably drive only the second display portion.

In the aforementioned structure having the first display portion including the second switching circuit, the driver circuit preferably controls the second switching circuit provided on the first display portion to switch the signal for the first display portion and to supply the switched signal to the first signal lines while turning off the first switching circuit provided on the second display portion when displaying image data on the first display portion. According to this structure, the driver circuit can easily supply the signal for the first display portion to only the first signal lines, thereby easily driving only the first display portion.

In the aforementioned structure having the first display portion including the second switching circuit, the driver circuit preferably alternately repeats an operation of supplying the signal for the second display portion to part of the first signal lines by the second switching circuit provided on the first display portion while switching the signal for the second display portion supplied through the part of the first signal lines with the first switching circuit provided on the second display portion and supplying the switched signal to the second signal lines and another operation of switching the signal for the first display portion with the second switching circuit provided on the first display portion and supplying the switched signal to the first signal lines while turning off the first switching circuit provided on the second display portion when displaying image data on the first display portion and the second display portion. According to this structure, the signals for the first and second display portions can be supplied to the first and second signal lines respectively, thereby driving both of the first and second display portions.

In the aforementioned structure having the first display portion including the second switching circuit, the first display portion and the second display portion preferably include counter electrodes for applying voltages to liquid crystals respectively, and the display preferably further comprises a first electrode control portion controlling the voltage applied to the counter electrode of the first display portion and a second electrode control portion controlling the voltage applied to the counter electrode of the second display portion, so that the first electrode control portion supplies a voltage signal to the corresponding counter electrode when performing an operation of displaying image data not only on the first display portion but also on the second display portion while the second electrode control portion supplies a voltage signal to the corresponding counter electrode when performing an operation of displaying image data not only on the second display portion but also on the first display portion when displaying image data on the first display portion and the second display portion. According to this structure, the display can maintain image data displayed on the second display portion also when performing an operation of displaying image data on the first display portion, while maintaining image data displayed on the first display portion also when performing an operation of displaying image data on the second display portion. Thus, the display can let the user recognize that both of the first and second display portions display image data.

The display according to the aforementioned aspect preferably further comprises a first board provided with the first display portion and a second board provided with the second display portion, while the driver circuit is preferably further arranged on the first board. According to this structure, the length of the signal lines for supplying the signal from the driver circuit to the first display portion can be reduced, and the display can be downsized.

In the aforementioned structure further comprising the first and second boards, the first signal lines may be provided on the first board, while the second signal lines may be provided on the second board.

In the aforementioned structure comprising the first and second boards, the display may further comprise a coupling line provided on the second board for coupling part of the first signal lines and the second signal lines with each other through the third signal lines.

In the display according to the aforementioned aspect, the plurality of first signal lines may each include a red signal transmission line transmitting a signal corresponding to red, a green signal transmission line transmitting a signal corresponding to green and a blue signal transmission line transmitting a signal corresponding to blue, and the partial first signal line for supplying the signal for the second display portion to the second display portion may be constituted of any one of the red signal transmission line, the green signal transmission line and the blue signal transmission line.

In the aforementioned structure including the plurality of third signal lines, the number of the third signal lines may be one third of the number of the second signal lines.

The display according to the aforementioned aspect may further comprise a first gate line scanning circuit provided on the first display portion for scanning gate lines of the first display portion, a second gate line scanning circuit provided on the second display portion for scanning gate lines of the second display portion, a sixth signal line supplying a signal for driving the first gate line scanning circuit from the driver circuit to the first gate line scanning circuit, and a seventh signal line supplying a signal for driving the second gate line scanning circuit from the driver circuit to the second gate line scanning circuit.

The display according to the aforementioned aspect preferably further comprises an eighth signal line directly connected from the driver circuit to gate lines of the first display portion for supplying a signal to the gate lines of the first display portion and a ninth signal line directly connected from the driver circuit to gate lines of the second display portion for supplying a signal to the gate lines of the second display portion. According to this structure, the signals can be directly supplied from the driver circuit to the gate lines of the first and second display portions through the eighth and ninth signal lines respectively. Therefore, no additional circuit may be separately provided for driving the gate lines of the first and second display portions respectively, whereby the structures of the first and second boards can be inhibited from complication.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a circuit diagram showing the structure of a liquid crystal display according to a third embodiment of the present invention; and FIG. 7 is a diagram for illustrating a display operation of the liquid crystal display according to the third embodiment of the present invention.

DESCRIPTION OF THE PREFERRED EMBODIMENTS

Embodiments of the present invention are now described with reference to the drawings.

First Embodiment

The structure of a liquid crystal display according to a first embodiment of the present invention is described with reference to FIG. 1. The first embodiment of the present invention is applied to the liquid crystal display, which is an exemplary display.

Figure 1:
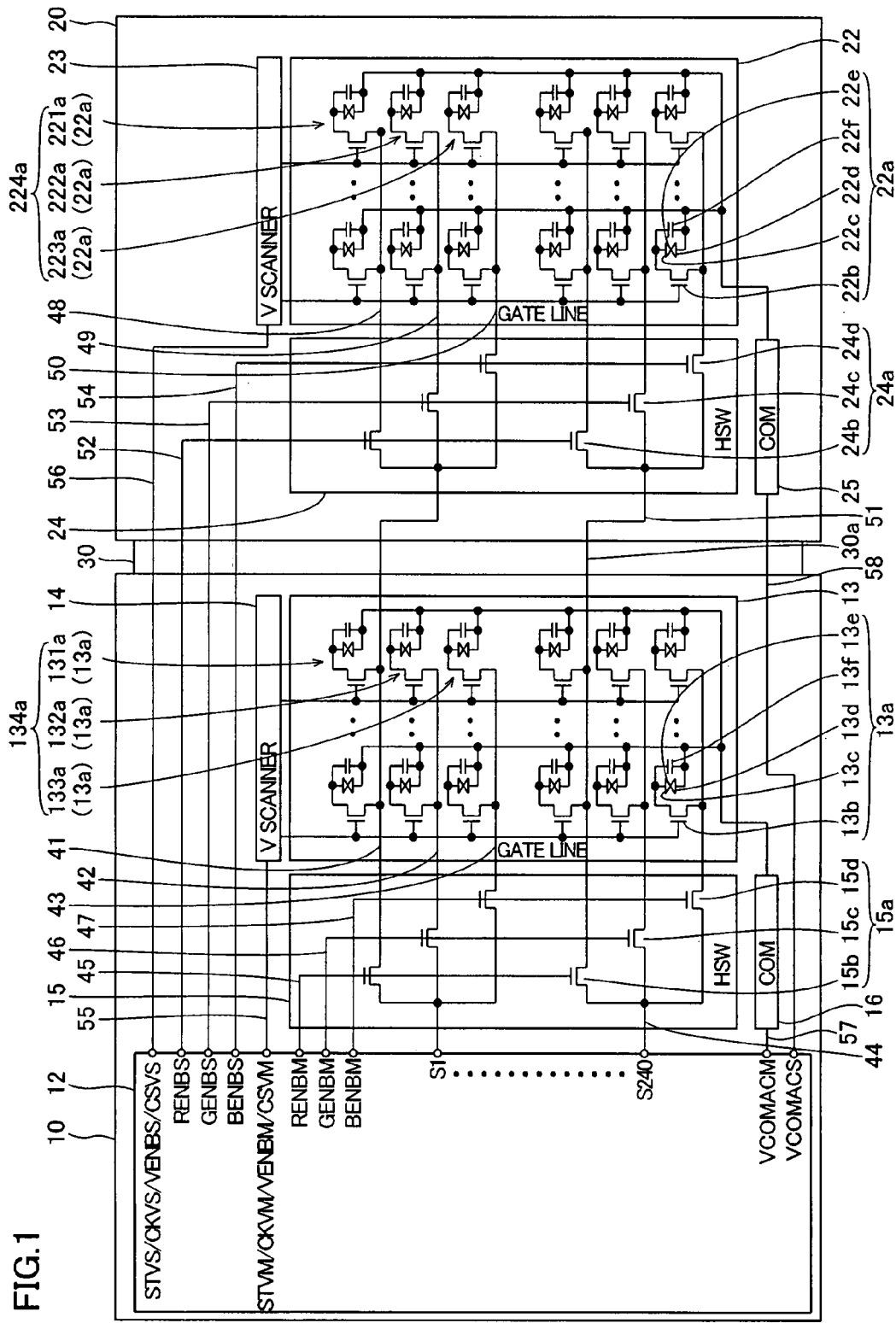
FIG. 1 is a circuit diagram showing the structure of a liquid crystal display according to a first embodiment of the present invention.

The liquid crystal display according to the first embodiment comprises a main board 10 and a sub board 20, as shown in FIG. 1. The main board 10 and the sub board 20 are electrically connected with each other through an FPC (flexible printed circuit board) 30. The main board 10 and the sub board 20 are examples of the "first board" and the "second board" respectively, and the FPC 30 is an example of the "wiring board" in the present invention.

The main board 10 is provided thereon with a driver IC 12, a main display 13 having dots 13a arranged in the form of a matrix, a V scanner (vertical scanner) 14 arranged along a first side of the main display 13 for driving (scanning) gate lines of the main display 13, an HSW (horizontal switch) 15 arranged along a second side of the main display 13 substantially perpendicular to the first side so that signal lines 41, 42 and 43 of the main display 13 are connected thereto and a COM 16 for controlling voltages applied to liquid crystals 13e described later. The driver IC 12 is provided on the main board 10 in a chip-on-glass system. The driver IC 12 is an example of the "driver circuit" in the present invention, and the main display 13 is an example of the "first display portion" in the present invention. The V scanner 14 is an example of the "first gate line scanning circuit" in the present invention, and the HSW 15 is an example of the "second switching circuit" in the present invention. The COM 16 is an example of the "first electrode control portion" in the present invention, and the signal lines 41, 42 and 43 are examples of the "first signal lines" in the present invention. The signal lines 41, 42 and 43 are also examples of the "red signal transmission line", the "green signal transmission line" and the "blue signal transmission line" in the present invention respectively.

Each dot 13a of the main display 13 is constituted of an n-type transistor 13b having a first source/drain region connected to the corresponding signal line 41, 42 or 43 and a gate connected to the corresponding gate line, a pixel electrode 13c, a counter electrode 13d, common to the dots 13a, opposed to the pixel electrode 13c, the corresponding liquid crystal 13e held between the pixel electrode 13c and the counter electrode 13c and an auxiliary capacitor 13f. The second source/drain region of the transistor 13b is connected to the pixel electrode 13c and a first electrode of the auxiliary capacitor 13f. This transistor 13b is constituted of a TFT (thin-film transistor) having an active layer of polycrystalline silicon (polysilicon) (hereinafter referred to as "low-temperature silicon") formed under a low-temperature condition of about 500° C.

Each pixel 134a is constituted of dots 131a, 132a and 133a, included in the dots 13a, enabled to emit red (R) light, green (G) light and blue (B) light through color filters (not shown) respectively. The dots 131a, 132a and 133a are connected to the signal lines 41, 42 and 43 respectively. 320 by 240 pixels 134a are arranged on the main display 13. Thus, 320 gate lines are connected to the V scanner 14, while 240 signal lines 41, 42 and 43 are connected to the HSW 15.

According to the first embodiment, the HSW 15 is so provided on the main board 10 as to time-share a signal supplied from each signal line 44 and to switch and supply the time-shared signal to the signal line 41, 42 or 43. This HSW 15 has 240 switches 15a. Each switch 15a includes n-type transistors 15b, 15c and 15d constituted of TFTs having active layers of low-temperature polysilicon. The transistors 15b, 15c and 15d have first source/drain regions connected to the corresponding signal lines 41, 42 and 43 respectively, and second source/drain regions connected to the corresponding signal line 44. Signal lines 45, 46 and 47 are connected to the gates of the transistors 15b, 15c and 15d respectively. Each switch 15a is so formed that only one of the transistors 15b, 15c and 15d enters an ON-state. More specifically, each switch 15a is so formed that the transistors 15b, 15c and 15d successively enter ON-states when the main display 15 is driven and only the transistors 15b enters an ON-state when a sub display 22 described later is driven. The switches 15a are examples of the "switching portions" in the present invention. The signal lines 45, 46 and 47 are examples of the "fifth signal lines" in the present invention.

The COM 16 is so provided on the main board 10 as to invert the voltages applied to the liquid crystals 13e held between the pixel electrodes 13c and the counter electrodes 13d every frame, for example, by controlling the potentials of the counter electrode 13d.

The sub board 20 is provided thereon with the sub display 22 having dots 22a arranged in the form of a matrix, a V scanner (vertical scanner) 23 arranged along a first side of the sub display 22 for driving (scanning) gate lines of the sub display 22, an HSW (horizontal switch) 24 arranged along a second side of the sub display 22 substantially perpendicular to the first side so that signal lines 48, 49 and 50 of the sub display 22 are connected thereto and a COM 25 for controlling voltages applied to liquid crystals 22e described later. The sub display 22 is an example of the "second display portion" in the present invention, and the V scanner 23 is an example of the "second gate line scanning circuit" in the present invention. The HSW 24 is an example of the "first switching circuit" in the present invention, and the COM 25 is an example of the "second electrode control portion" in the present invention. The signal lines 48, 49 and 50 are examples of the "second signal lines" in the present invention.

Each dot 22a of the sub display 22 is constituted of an n-type transistor 22b having a first source/drain region connected to the corresponding signal line 48, 49 or 50 and a gate connected to the corresponding gate line, a pixel electrode 22c, a counter electrode 22d, common to the dots 22a, opposed to the pixel electrode 22c, the corresponding liquid crystal 22e held between the pixel electrode 22c and the counter electrode 22d and an auxiliary capacitor 22c. The second source/drain region of the transistor 22b is connected to the pixel electrode 22c and a first electrode of the auxiliary capacitor 22f. This transistor 22b is constituted of a TFT having an active layer of low-temperature polysilicon.

Each pixel 224a is constituted of dots 221a, 222a and 223a, included in the dots 22a, enabled to emit red (R) light, green (G) light and blue (B) light through color filters (not shown) respectively. The dots 221a, 222a and 223a are connected to the signal lines 48, 49 and 50 respectively. 320 by 240 pixels 224a are arranged on the sub display 22. Thus, 320 gate lines are connected to the V scanner 23, while 240 signal lines 48, 49 and 50 are connected to the HSW 24.

According to the first embodiment, the HSW 24 is so provided on the sub board 20 as to time-share a signal supplied from each signal line 51 and to switch and supply the time-shared signal to the signal line 48, 49 or 50. This HSW 24 has 240 switches 24a. Each switch 24a includes n-type transistors 24b, 24c and 24d constituted of TFTs having active layers of low-temperature polysilicon. The transistors 24b, 24c and 24d have first source/drain regions connected to the corresponding signal lines 48, 49 and 50 respectively, and second source/drain regions connected to the corresponding signal line 51. Signal lines 52, 53 and 54 are connected to the gates of the transistors 24b, 24c and 24d respectively. Each switch 24a is so formed that the transistors 24b, 24c and 245d successively enter ON-states when the sub display 22 is driven and all transistors 24b, 24c and 24d enter OFF-states when the main display 13 is driven. The signal line 51 is am example of the "coupling line" in the present invention. The signal lines 52, 53 and 54 are examples of the "fourth signal lines" in the present invention.

The COM 25 is so provided on the sub board 20 as to invert the voltages applied to the liquid crystals 22e held between the pixel electrodes 22c and the counter electrodes 22d every frame, for example, by controlling the potentials of the counter electrode 22d.

According to the first embodiment, the FPC 30 is provided with 240 signal lines 30a for connecting the signal lines 41 and 51 with each other. The signal lines 30a are examples of the "third signal lines" in the present invention.

According to the first embodiment, the driver IC 12 provided on the main board 10 has a function for outputting a start signal STVM, a clock signal CKVM, an enabling signal VENBM and a scanning direction switching signal CSVM for controlling the V scanner 14, a start signal STVS, a clock signal CKVS, an enabling signal VENBS and a scanning direction switching signal CSVS for controlling the V scanner 23, enabling signals RENBM, GENBM and BENBM for controlling the HSW 15, enabling signals RENBS, GENBS and BENBS for controlling the HSW 24, a control signal VCOMACM for controlling the COM 16, a control signal VCOMACS for controlling the COM 25 and image signals S1 to S240 for controlling the main display 13 or the sub display 22. The image signals S1 to S240 have image signals R1 to R240, G1 to G240 and B1 to B240, and are time-shared by the HSW 15 so that the image signals R1 to R240, G1 to G240 and B1 to B240 are supplied to the signal lines 41, 42 and 43 respectively when the main display 13 is driven. When the sub display 22 is driven, on the other hand, the image signals S1 to S240 are time-shared by the HSW 24 so that the image signals R1 to R240, G1 to G240 and B1 to B240 are supplied to the signal lines 48, 49 and 50 respectively. This point is described later in detail.

The driver IC 12 is so formed as to supply the start signal STVM, the clock signal CKVM and the enabling signal VENBM to the V scanner 14 through signal lines 55, in order to drive the main display 13. More specifically, the driver IC 12 is so formed as to successively drive the 320 gate lines connected to the V scanner 14 thereby successively turning on 720 transistors 13b connected to the gate lines when driving the main display 13. While FIG. 1 shows only one signal line 55 as the signal line for the start signal STVM, the clock signal CKVM, the enabling signal VENBM and the scanning direction switching signal CSVM for simplifying the illustration, four signal lines 55 are provided in practice for supplying the start signal STVM, the clock signal CKVM, the enabling signal VENBM and the scanning direction switching signal CSVM respectively. The signal line 55 is an example of the "sixth signal line" in the present invention.

The driver IC 12 is also so formed as to supply the start signal STVS, the clock signal CKVS and the enabling signal VENBS to the V scanner 23 through signal lines 56, in order to drive the sub display 22. More specifically, the driver IC 12 is so formed as to successively drive the 320 gate lines connected to the V scanner 23 thereby successively turning on 720 transistors 22b connected to the gate lines when driving the sub display 22. While FIG. 1 shows only one signal line 56 as the signal line for the start signal STVS, the clock signal CKVS, the enabling signal VENBS and the scanning direction switching signal CSVS for simplifying the illustration, four signal lines 56 are provided in practice for supplying the start signal STVS, the clock signal CKVS, the enabling signal VENBS and the scanning direction switching signal CSVS respectively. The signal line 56 is an example of the "seventh signal line" in the present invention.

According to the first embodiment, the enabling signals RENBM, GENBM and BENBM are supplied to the gates of the transistors 15b, 15f and 15d of the HSW 15 through the signal lines 45, 46 and 47 respectively. More specifically, the driver IC 12 is so formed as to successively supply high-level enabling signals RENBM, GENBM and BENBM to the signal lines 45, 46 and 47 thereby successively turning on the transistors 15b, 15c and 15d one by one when driving the main display 13. The driver IC 12 is also so formed as to supply a high-level enable signal RENBM to the signal line 45 while supplying low-level enabling signals GENBM and BENBM to the signal lines 46 and 47 respectively thereby turning on only the transistors 15b when driving the sub display 22.

According to the first embodiment, the enabling signals RENBS, GENBS and BENBS are supplied to the gates of the transistors 24b, 24c and 24d of the HSW 24 through the signal lines 52, 53 and 54 respectively. More specifically, the driver IC 12 is so formed as to successively supply high-level enabling signals RENBS, GENBS and BENBS to the signal lines 52, 53 and 54 thereby successively turning on the transistors 24b, 24c and 24d one by one when driving the sub display 22. The driver IC 12 is also so formed as to supply low-level enabling signals RENBS, GENBS and BENBS to the signal lines 52, 53 and 54 thereby turning off all transistors 24b, 24c and 24d when driving the main display 13.

The driver IC 12 is further so formed as to supply the pulsing control signal VCOMACM to the COM 16 through a signal line 57 when displaying image data on the main display 13, while supplying the pulsing control signal VCOMACS to the COM 25 through a signal line 58 when displaying image data on the sub display 22.

The driver IC 12 is further so formed as to supply the image signals R1 to R240 corresponding to red to the pixel electrodes 13c of the dots 131a through the signal lines 44, the transistors 15b and the signal lines 41 when driving the dots 131a, to supply the image signals G1 to G240 corresponding to green to the pixel electrodes 13c of the dots 132a through the signal lines 44, the transistors 15c and the signal lines 42 when driving the dots 132a, and to supply the image signals B1 to B240 corresponding to blue to the pixel electrodes 13c of the dots 133a through the signal lines 44, the transistors 15d and the signal lines 43 when driving the dots 133a.

The driver IC 12 is further so formed as to supply the image signals R1 to R240 corresponding to red to the pixel electrodes 22c of the dots 221a through the signal lines 44, the transistors 15b, the signal lines 41, 30a and 51, the transistors 24b and the signal lines 48 when driving the dots 221a, to supply the image signals G1 to G240 corresponding to green to the pixel electrodes 22c of the dots 222a through the signal lines 44, the transistors 15b, the signal lines 41, 30a and 51, the transistors 24c and the signal lines 49 when driving the dots 222a, and to supply the pixel signals B1 to B240 corresponding to blue to the pixel electrodes 22c of the dots 223a through the signal lines 44, the transistors 15b, the signal lines 41, 30a and 51, the transistors 24d and the signal lines 50 when driving the dots 223a.

A display operation of the liquid crystal display according to the first embodiment of the present invention is described with reference to FIGS. 1 to 4.

Figure 2:
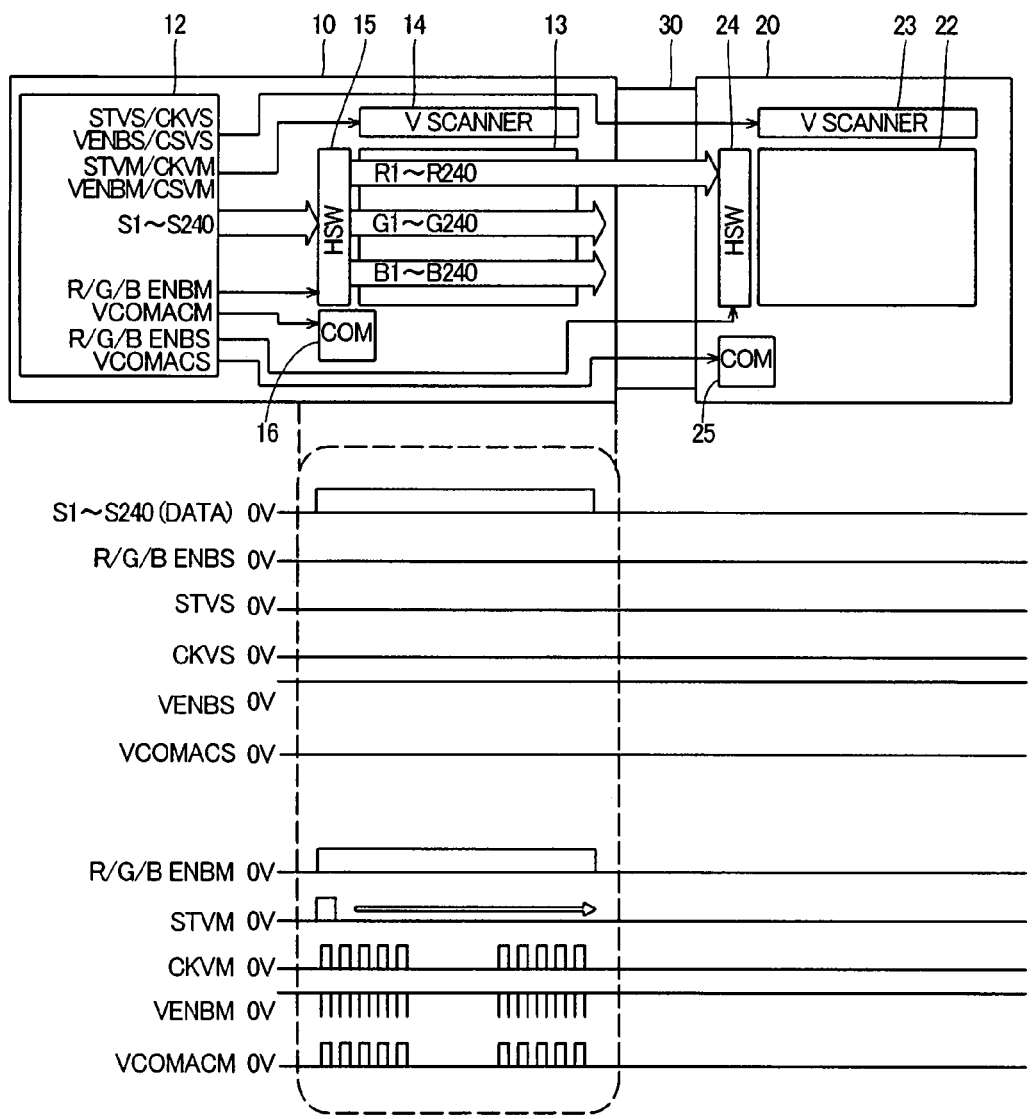
FIGS. 2 to 4 are diagrams for illustrating a display operation of the liquid crystal display according to the first embodiment of the present invention.

In order to display image data only on the main display 13, low-level enabling signals RENBS, GENBS and BENBS are supplied to the signal lines 52, 53 and 54 respectively, as shown in FIGS. 1 and 2. Thus, the transistors 24b, 24c and 24d of the HSW 24 for the sub display 22 are turned off, so that no image signals S1 to S240 are supplied to the dots 22a of the sub display 22. Further, the start signal STVS, the clock signal CKVS and the enabling signal VENBS serving as driving signals are not supplied to the V scanner 23 for the sub display 22. Thus, the V scanner 23 is not driven, so that the gate lines of the sub display 22 remain undriven. No pulsing control signal VCOMACS is supplied to the COM 25 for the sub display 22.

On the other hand, the start signal STVM, the clock signal CKVM and the enabling signal VENBM serving as driving signals are supplied to the V scanner 14 for the main display 13. Thus, the V scanner 14 is so driven as to successively drive the gate lines of the main display 13. Further, high-level enabling signals RENBM, GENBM and BENBM are successively supplied to the signal lines 45, 46 and 47 respectively, thereby successively turning on the transistors 15b, 15c and 15d of the HSW 15 for the main display 13. The pulsing control signal VCOMACM is supplied to the COM 16 for the main display 13.

More specifically, a high-level signal is successively supplied to the 320 gate lines connected to the V scanner 14, thereby turning on the transistors 13b of the 720 dots 13a connected to the gate lines supplied with the high-level signal. At this time, the transistors 15b, 15c and 15d successively enter ON-states due to the enabling signals RENBM, GENBM and BENBM. The image signals R1 to R240 are output when the transistors 15b are in ON-states, the image signals G1 to G240 are output when the transistors 15c are in ON-states, and the image signals B1 to B240 are output when the transistors 15d in ON-states.

Therefore, the image signals R1 to R240 are supplied to the pixel electrodes 13c of the dots 131a through the signal lines 44, the transistors 15b, the signal lines 41 and the transistors 13b, to be written in the dots 131a connected to the gate lines supplied with the high-level signal. Further, the image signals G1 to G240 are supplied to the pixel electrodes 13c of the dots 132a through the signal lines 44, the transistors 15c, the signal lines 42 and the transistors 13b, to be written in the dots 132a connected to the gate lines supplied with the high-level signal. In addition, the image signals B1 to B240 are supplied to the pixel electrodes 13c of the dots 133a through the signal lines 44, the transistors 15d, the signal lines 43 and the transistors 13b, to be written in the dots 133a connected to the gate lines supplied with the high-level signal.

Figure 3:
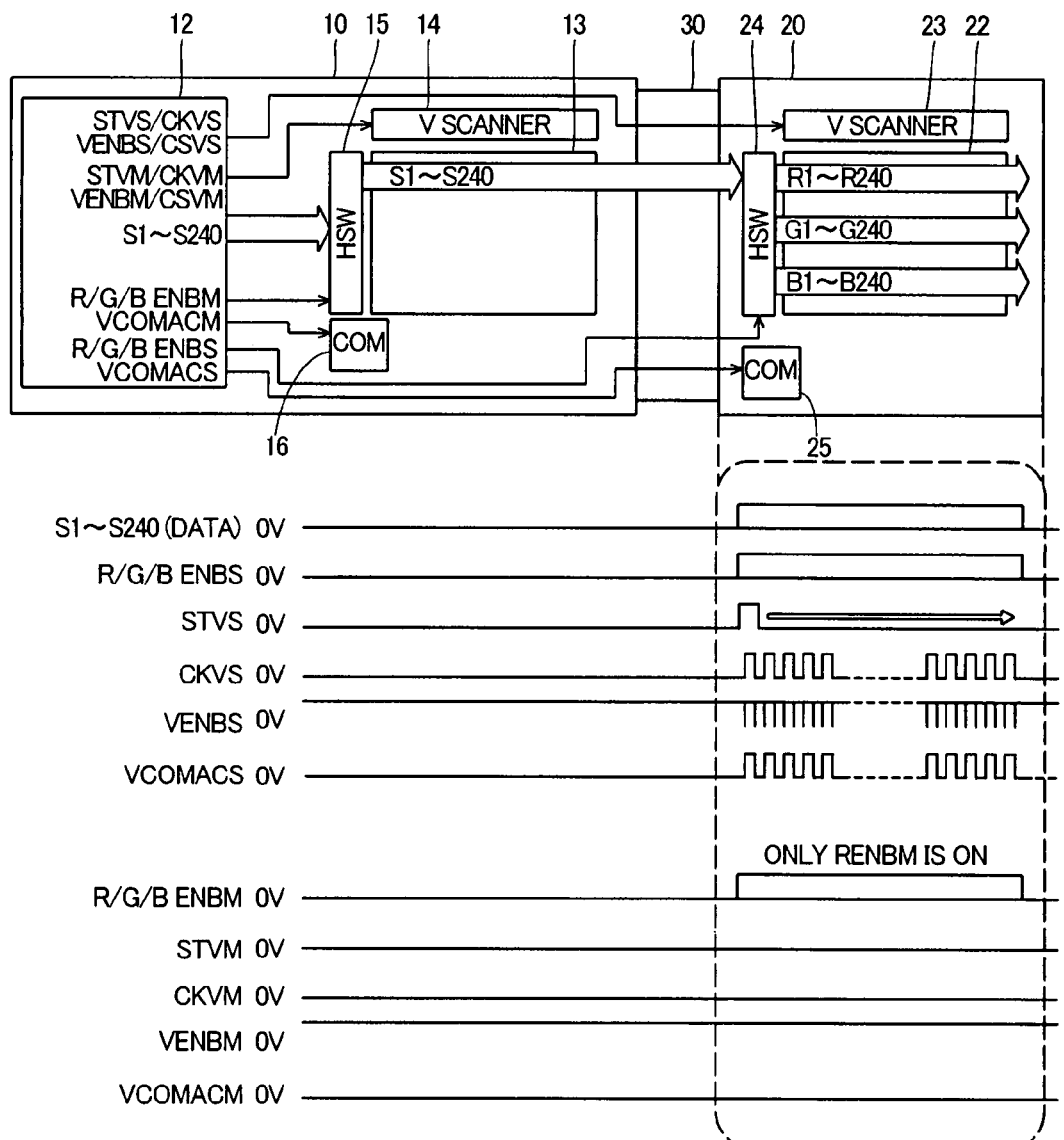

In order to display image data only on the sub display 22, a high-level enabling signal RENBM is supplied to the signal line 45 while low-level enabling signals GENBM and BENBM are supplied to the signal lines 46 and 47, as shown in FIGS. 1 and 3. Thus, the transistors 15b enter ON-states and the transistors 15c and 15d enter OFF-states in the HSW 15 for the main display 13, whereby the image signals S1 to S240 are supplied to the HSW 24 through the signal lines 44, the transistors 15b and the signal lines 41, 30a and 51. The start signal STVM, the clock signal CKVM and the enabling signal VENBM are not supplied to the V scanner 14 for the main display 13. Thus, the V scanner 14 is not driven, so that the gate lines of the main display 13 remain undriven. No pulsing control signal VCOMACM is supplied to the COM 16 for the main display 13.

On the other hand, the start signal STVS, the clock signal CKVS and the enabling signal VENBS are supplied to the V scanner 23 for the sub display 22. Thus, the V scanner 23 is so driven as to successively drive the gate lines of the sub display 22. Further, high-level enabling signals RENBS, GENBS and BENBS are successively supplied to the signal lines 52, 53 and 54, thereby successively turning on the transistors 24b, 24c and 24d of the HSW 24 for the sub display 22. The pulsing control signal VCOMACS for the sub display 22 is supplied to the COM 25.

More specifically, a high-level signal is successively supplied to the 320 gate lines connected to the V scanner 23, thereby turning on the transistors 22b of the 720 dots 22a connected to the gate lines supplied with the high-level signal. At this time, the transistors 24b, 24c and 24d successively enter ON-states due to the enabling signals RENBS, GENBS and BENBS. The image signals R1 to R240 are output when the transistors 24b are in ON-states, the image signals G1 to G240 are output when the transistors 24c are in ON-states, and the image signals B1 to B240 are output when the transistors 24d are in ON-states.

Therefore, the image signals R1 to R240 are supplied to the pixel electrodes 22c of the dots 221a through the signal lines 44, the transistors 15b, the signal lines 41, 30a and 51, the transistors 24b, the signal lines 48 and the transistors 22b, to be written in the dots 221a connected to the gate lines supplied with the high-level signal. Further, the image signals G1 to G240 are supplied to the pixel electrodes 22c of the dots 222a through the signal lines 44, the transistors 15b, the signal lines 41, 30a and 51, the transistors 24c, the signal lines 49 and the transistors 22b, to be written in the dots 222a connected to the gate lines supplied with the high-level signal. In addition, the image signals B1 to B240 are supplied to the pixel electrodes 22c of the dots 223a through the signal lines 44, the transistors 15b, the signal lines 41, 30a and 51, the transistors 24d, the signal lines 50 and the transistors 22b, to be written in the dots 223a connected to the gate lines supplied with the high-level signal.

Figure 4:
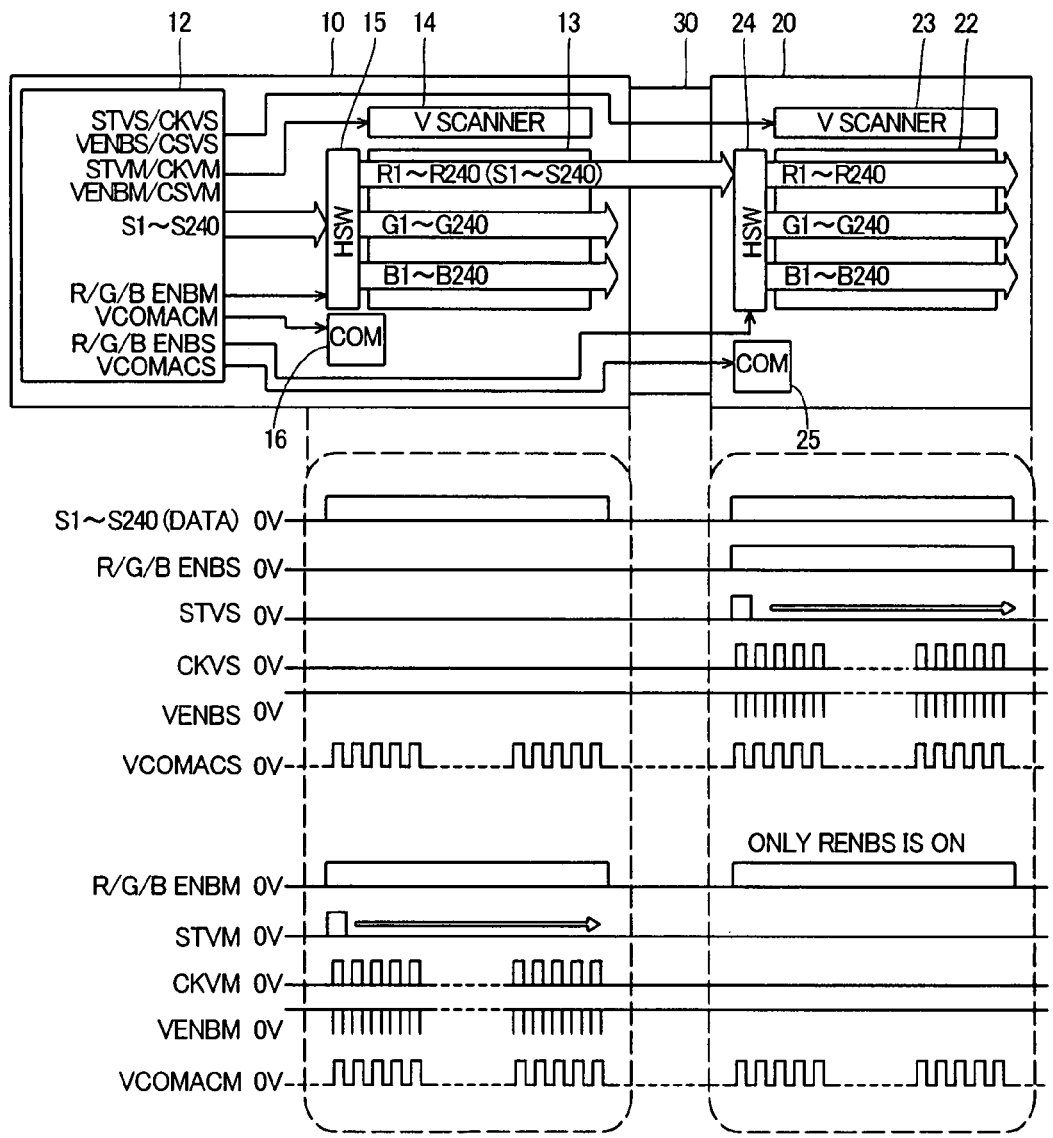

In order to display image data on both of the main display 13 and the sub display 22, the aforementioned operation for displaying image data only on the main display 13 and that for displaying image data only on the sub display 22 are alternately repeated, as shown in FIGS. 1 and 4. In this case, the pulsing control signal VCOMACM is supplied to the COM 25 during the operation of displaying image data on the main display 13, while the pulsing control signal VCOMACM is supplied to the COM 16 during the operation of displaying image data on the sub display 22. Thus, the liquid crystal display can maintain image data displayed on the sub display 22 also when any image signals are written in the dots 13a of the main display 13, and maintain image data displayed on the main display 13 also when any image signals are written in the dots 22a of the sub display 22. When alternately repeating operations of writing image data in the main display 13 and in the sub display 22 every 1/120 seconds in this case, the liquid crystal display can let the user recognize that both of the main display 13 and the sub display 22 regularly display image data.

According to the first embodiment, as hereinabove described, the liquid crystal display comprises the signal lines 41 serving also as signal lines for supplying the image signals S1 to S240 output from the driver IC 12 to the sub display 22, the HSW 24 switching the image signals S1 to S240 supplied through the signal lines 41 by time sharing, the signal lines 48, 49 and 50 for supplying the image signals R1 to R240, G1 to G240 and B1 to B240 switched by the HSW 24 to the sub display 22 and the FPC 30 for electrically connecting the main display 13 and the sub display 22 with each other while the FPC 30 includes the signal lines 30a for supplying the image signals S1 to S240 received from the signal lines 41 to the HSW 24, whereby the number of the signal lines 41 can be reduced as compared with that of the signal lines 48, 49 and 50 due to the HSW 24 having the time-sharing function. Thus, the number of the signal lines 30a of the FPC 30 connecting the main display 13 and the sub display 22 with each other can be so reduced that the interval between the signal lines 30a formed on the FPC 30 can be inhibited from reduction also when the sub display 22 has a large number of pixels 224a. Consequently, the FPC 30 can be prevented from difficulty in formation of the signal lines 30a.

According to the first embodiment, the liquid crystal display is provided with the HSW 15 switching the image signals S1 to S240 received from the driver IC 12 and supplying the same to the signal lines 41, 42 and 43, whereby the number of the signal lines 44 for supplying the image signals S1 to S240 received from the driver IC 12 to the main display 13 can be reduced due to the HSW 15 having the time-sharing function.

The number of the image signals R1 to R240, G1 to G240 and B1 to B240 resulting from the time sharing by the HSW 24 and that of the image signals R1 to R240, G1 to G240 and B1 to B240 resulting from the time sharing by the HSW 15 are identical to each other so that the same type of switching circuits can be employed as the HSWs 15 and 24, whereby the HSWs 15 and 24 can be controlled by a common method. Thus, the circuit structure of the driver IC 12 controlling the HSWs 15 and 24 can be simplified.

According to the first embodiment, the liquid crystal display is provided with the three signal lines 45, 46 and 47 for supplying the enabling signals RENBM, GENBM and BENBM for controlling the HSW 15 from the driver IC 12 to the HSW 15 and the three signal lines 52, 53 and 54 for supplying the enabling signals RENBS, GENBS and BENBS for controlling the HSW 24 from the driver IC 12 to the HSW 24, whereby the driver IC 12 can easily drive the HSWs 15 and 24.

According to the first embodiment, the liquid crystal display is provided with the main board 10 on which the driver IC 12 and the main display 13 are arranged, whereby the lengths of the signal lines 44, 45, 46, 47, 55 and 57 for supplying the signals from the driver IC 12 to the main display 13 can be reduced, and the liquid crystal display can be downsized.

According to the first embodiment, the driver IC 12 is so formed as to turn on only the transistors 15b of the HSW 15 corresponding to the signal lines 41, included in the signal lines 41, 42 and 43, for supplying the signals for the sub display 22 to the sub display 22 when displaying image data on the sub display 22 so that the signal lines 42 and 43 other than the signal lines 41 for supplying the signals for the sub display 22 to the sub display 22 enter OFF-states, whereby the driver IC 12 can reliably drive only the sub display 22.

According to the first embodiment, the main display 13 and the sub display 22 are so formed as to include the counter electrodes 13d and 22d for applying voltages to the liquid crystals 13e and 22e respectively and to further include the COMs 16 and 25 controlling the voltages applied to the counter electrodes 13d and 22d of the main display 13 and the sub display 22 respectively for controlling the COM 16 to supply voltage signals to the counter electrodes 13d when performing an operation of displaying image data not only on the main display 13 but also on the sub display 22 and controlling the COM 25 to supply voltage signals to the counter electrodes 22d when performing an operation of displaying image data not only on the sub display 22 but also on the main display 13, whereby the liquid crystal display can maintain image data displayed on the sub display 22 also when performing an operation of displaying image data on the main display 13, while maintaining image data displayed on the main display 13 also when performing an operation of displaying image data on the sub display 22. Therefore, the liquid crystal display can let the user recognize that both of the main display 13 and the sub display 22 display image data.

Second Embodiment

Figure 5:
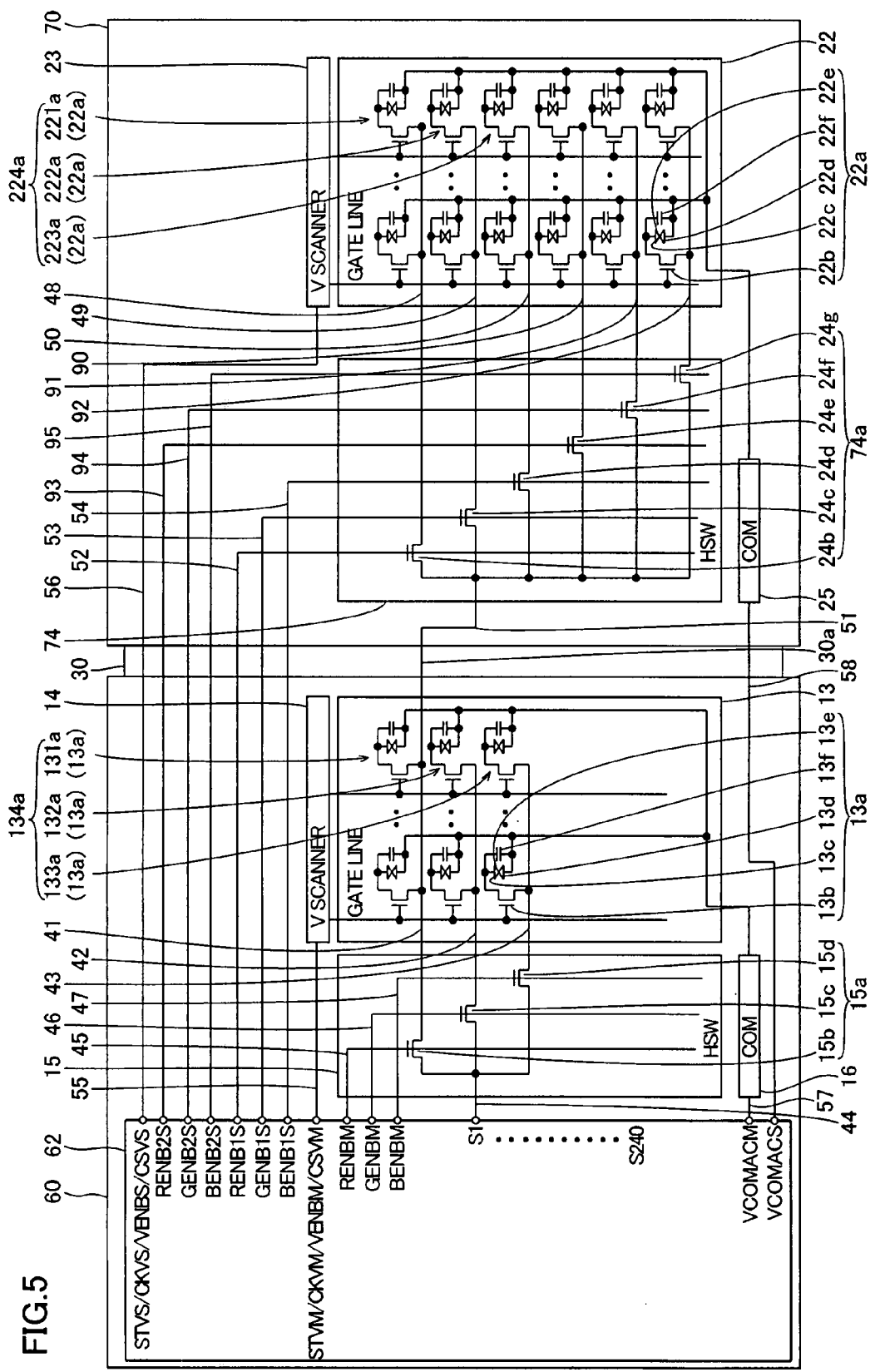
FIG. 5 is a circuit diagram showing the structure of a liquid crystal display according to a second embodiment of the present invention.

Referring to FIG. 5, an HSW 74 divides image signals S1 to S120 into six types of image signals $R_1 1$ to $R_1 120$, $G_1 1$ to $G_1 120$, $B_1 1$ to $B_1 120$, $R_2 1$ to $R_2 120$, $G_2 1$ to $G_2 120$ and $B_2 1$ to $B_2 120$ in a liquid crystal display according to a second embodiment of the present invention, dissimilarly to the aforementioned first embodiment.

The liquid crystal display according to the second embodiment comprises a main board 60 and a sub board 70, as shown in FIG. 5. The main board 60 and the sub board 70 are examples of the "first board" and the "second board" in the present invention respectively. The main board 60 and the sub board 70 are electrically connected with each other through an FPC (flexible printed circuit board) 30.

The main board 60 is provided thereon with a main display 13, a V scanner (vertical scanner) 14, an HSW (horizontal switch) 15, a COM 16 and a driver IC 62. The driver IC 62 is provided on the main board 60 in a chip-on-glass system. The driver IC 62 is an example of the "driver circuit" in the present invention.

The sub board 70 is provided thereon with a sub display 22, a V scanner (vertical scanner) 23, the HSW (horizontal switch) 74 to which signal lines 48, 49, 50, 90, 91 and 92 for the sub display 22 are connected and a COM 25. The HSW 74 is an example of the "first switching circuit" in the present invention. The signal lines 90, 91 and 92 are examples of the "second signal lines" in the present invention. Dots 22a of the sub display 22 include transistors 22b having first source/drain regions connected to the signal lines 48, 49, 50, 90, 91 and 92.

According to the second embodiment, the HSW 74 is so provided on the sub board 70 as to time-share signals supplied from signal lines 51 and to switch and supply the time-shared signals to the signal lines 48, 49, 50, 90, 91 and 92. 120 signal lines 48, 49, 50, 90, 91 and 92 are connected to the HSW 74, which in turn has 120 switches 74a. Each switch 74a includes n-type transistors 24b to 24g constituted of TFTs having active layers of low-temperature polysilicon. The transistors 24b to 24g have first source/drain regions connected to the corresponding signal lines 48, 49, 50, 90, 91 and 92 respectively and second source/drain regions connected to the corresponding signal line 51. Signal lines 52, 53, 54, 93, 94 and 95 are connected to the gates of the transistors 24b to 24g respectively. Each switch 74a is so formed that the transistors 24b to 24g successively enter ON-states when the sub display 22 is driven and all transistors 24b to 24g enter OFF-states when the main display 13 is driven. The HSW 74 is an example of the "first switching circuit" in the present invention. The signal lines 93, 94 and 95 are examples of the "fourth signal lines" in the present invention.

According to the second embodiment, the FPC 30 is provided with 120 signal lines 30a for connecting the signal lines 41 and 51 with each other.

According to the second embodiment, the driver IC 62 provided on the main board 60 has a function for outputting a start signal STVM, a clock signal CKVM, an enabling signal VENBM, a scanning direction switching signal CSVM, a start signal STVS, a clock signal CKVS, an enabling signal VENBS, a scanning direction switching signal CSVS, enabling signals RENBM, GENBM and BENBM, control signals VCOMACM and VCOMACS, enabling signals RENB1S, GENB1S, BENB1S, REB2S, GENB2S and BENB2S for controlling the HSW 74 and image signals S1 to S240 for controlling the main display 13 or image signals S1 to S120 for controlling the sub display 22. The image signals S1 to S120 for controlling the sub display 22 have the image signals $R_1 1$ to $R_1 120$, $G_1 1$ to $G_1 120$, $B_1 1$ to $B_1 120$, $R_2 1$ to $R_2 120$, $G_2 1$ to $G_2 120$ and $B_2 1$ to $B_2 120$ and are so time-shared by the HSW 74 that the image signals $R_1 1$ to $R_1 120$, $G_1 1$ to $G_1 120$, $B_1 1$ to $B_1 120$, $R_2 1$ to $R_2 120$, $G_2 1$ to $G_2 120$ and $B_2 1$ to $B_2 120$ are supplied to the signal lines 48, 49, 50, 90, 91 and 92 respectively.

According to the second embodiment, the enabling signals RENB1S, GENB1S, BENB1S, REB2S, GENB2S and BENB2S are supplied to the gates of the transistors 24b to 24g of the HSW 74 through the signal lines 52, 53, 45, 93, 94 and 95 respectively. More specifically, the driver IC 62 is so formed as to successively supply high-level enabling signals RENB1S, GENB1S, BENB1S, REB2S, GENB2S and BENB2S to the signal lines 52, 53, 54, 93, 94 and 95 thereby successively turning on the transistors 24b to 24g one by one when driving the sub display 22. The driver IC 62 is also so formed as to supply low-level enabling signals RENB1S, GENB1S, BENB1S, REB2S, GENB2S and BENB2S to the signal lines 52, 53, 54, 93, 94 and 95 thereby turning off all transistors 24b to 24g when driving the main display 13.

The driver IC 62 is further so formed as to supply the image signals $R_1 1$ to $R_1 120$ corresponding to red to pixel electrodes 22c of dots 221a connected to the signal lines 48 through the signal lines 44, the transistors 15b, the signal lines 41, 30a and 51, the transistors 24b and the signal lines 48 when driving the dots 221a, to supply the image signals $G_1 1$ to $G_1 120$ corresponding to green to pixel electrodes 22c of dots 222a connected to the signal lines 49 through the signal lines 44, the transistors 15b, the signal lines 41, 30a and 51, the transistors 24c and the signal lines 49 when driving the dots 222a, and to supply the image signals $B_1 1$ to $B_1 120$ corresponding to blue to pixel electrodes 22c of dots 223a connected to the signal lines 50 through the signal lines 44, the transistors 15b, the signal lines 41, 30a and 51, the transistors 24d and the signal lines 50 when driving the dots 223a.

The driver IC 62 is further so formed as to supply the image signals $R_2 1$ to $R_2 120$ corresponding to red to pixel electrodes 22c of dots 221a connected to the signal lines 90 through the signal lines 44, the transistors 15b, the signal lines 41, 30a and 51, the transistors 24e and the signal lines 90 when driving the dots 221a, to supply the image signals $G_2 1$ to $G_2 120$ corresponding to green to pixel electrodes 22c of dots 222a connected to the signal lines 91 through the signal lines 44, the transistors 15b, the signal lines 41, 30a and 51, the transistors 24f and the signal lines 91 when driving the dots 222a, and to supply the image signals $B_2 1$ to $B_2 120$ corresponding to blue to pixel electrodes 22c of dots 223a connected to the signal lines 92 through the signal lines 44, the transistors 15b, the signal lines 41, 30a and 51, the transistors 24g and the signal lines 92 when driving the dots 223a.

A display operation of the liquid crystal display according to the second embodiment is similar to that of the aforementioned first embodiment.

According to the second embodiment, as hereinabove described, the liquid crystal display is provided with the HSW 74 dividing the image signals S1 to S120 into the six types of image signals $R_1 1$ to $R_1 120$, $G_1 1$ to $G_1 120$, $B_1 1$ to $B_1 120$, $R_2 1$ to $R_2 120$, $G_2 1$ to $G_2 120$ and $B_2 1$ to $B_2 120$ so that the number of the signal lines 30a formed on the FPC 30 can be reduced to 120, i.e., half that of the signal lines 30a provided in the liquid crystal display according to the first embodiment. Thus, increase in the number of the signal lines 30a formed on the FPC 30 can be further suppressed.

According to the second embodiment, the number of the signals resulting from the time sharing by the HSW 74 provided on the sub display 22 is greater than that of the signals resulting from the time sharing by the HSW 15 provided on the main display 13 so that the HSW 74 time-shares a larger number of signals as compared with the HSW 15, whereby the sub display 22 can be supplied with the signals through the smaller number of signal lines 30a. Therefore, increase in the number of the signal lines can be further suppressed.

The remaining effects of the second embodiment are similar to those of the aforementioned first embodiment.

Third Embodiment

Referring to FIG. 6, no V scanners are arranged on a main board 110 and a sub board 120 in a liquid crystal display according to a third embodiment of the present invention, dissimilarly to the aforementioned first and second embodiments.

The liquid crystal display according to the third embodiment comprises the main board 110 and the sub board 120, as shown in FIG. 6. The main board 110 and the sub board 120 are examples of the "first board" and the "second board" in the present invention respectively. The main board 110 and the sub board 120 are electrically connected with each other through an FPC (flexible printed circuit board) 30.

The main board 110 is provided thereon with a driver IC 112, a main display 113 having dots 113a arranged in the form of a matrix, an HSW (horizontal switch) 15 and a COM 16. The driver IC 112 is provided on the main board 110 in a chip-on-glass system. The main display 113 is an example of the "first display portion" in the present invention, and the driver IC 112 is an example of the "driver circuit" in the present invention.

Each dot 113a of the main display 113 is constituted of an n-type transistor 113b having a first source/drain region connected to a corresponding signal line 41, 42 or 43 and a gate connected to a corresponding gate line, a pixel electrode 13c, a counter electrode 13d, a liquid crystal 13e and an auxiliary capacitor 13f. The second source/drain region of the transistor 113b is connected to the pixel electrode 13c and a first electrode of the auxiliary capacitor 13f. This transistor 113b is constituted of a TFT (thin-film transistor) having an active layer of amorphous silicon.

Each pixel 513a is constituted of dots 213a, 313a and 413a, included in the dots 113a, enabled to emit red (R) light, green (G) light and blue (B) light through color filters (not shown) respectively. The dots 213a, 313a and 413a are connected to the signal lines 41, 42 and 43 respectively. 320 by 240 pixels 513a are arranged on the main display 113. Thus, 320 gate lines are connected to the HSW driver IC 112 through signal lines 59a respectively. The signal lines 59a are examples of the "eighth signal line" in the present invention.

The sub board 120 includes a sub display 122 having dots 122a arranged in the form of a matrix, an HSW (horizontal switch) 24 and a COM 25. The sub display 122 is an example of the "second display portion" in the present invention.

Each dot 122a of the sub display 122 is constituted of an n-type transistor 122b having a first source/drain region connected to the corresponding signal line 48, 49 or 50 and a gate connected to the corresponding gate line, a pixel electrode 22c, a counter electrode 22d, a liquid crystal 22e and an auxiliary capacitor 22c. The second source/drain region of the transistor 122b is connected to the pixel electrode 22c and a first electrode of the auxiliary capacitor 22f. This transistor 122b is constituted of a TFT having an active layer of amorphous silicon.

Each pixel 622a is constituted of dots 322a, 422a and 522a, included in the dots 122a, enabled to emit red (R) light, green (G) light and blue (B) light through color filters (not shown) respectively. The dots 322a, 422a and 522a are connected to the signal lines 48, 49 and 50 respectively. 320 by 240 pixels 622a are arranged on the sub display 122. Thus, 320 gate lines are connected to the driver IC 112 through signal lines 59b respectively. The signal lines 59b are examples of the "ninth signal line" in the present invention.

According to the third embodiment, the driver IC 112 provided on the main board 110 has a function for outputting a control signal GATEM for controlling the gate lines of the main display 113, a control signal GATES for controlling the gate lines of the sub display 112, enabling signals RENBM, GENBM, BENBM, RENBS, GENBS and BENBS, control signals VCOMACM and VCOMACS and image signals S1 to S240.

According to the third embodiment, the driver IC 112 is so formed as to successively supply a high-level control signal GATEM to the gate lines of the main display 113 when driving the main display 113, and to successively supply a high-level control signal GATES to the gate lines of the sub display 122 when driving the sub display 122. While FIG. 6 shows only one signal line 59a to which each gate line of the main display 113 is connected as the signal line for the control signal GATEM for simplifying the illustration, 320 signal lines 59a are provided in practice so that the 320 gate lines of the main display 113 are connected thereto respectively. Similarly, while FIG. 6 shows only one signal line 59b to which each gate line of the sub display 122 is connected as the signal line for the control signal GATES, 320 signal lines 59b are provided in practice so that the 320 gate lines of the sub display 122 are connected thereto respectively.

A display operation of the liquid crystal display according to the third embodiment of the present invention is now described with reference to FIGS. 6 and 7.

In order to display image data only on the main display 113, no image signals S1 to S240 are supplied to the dots 122a of the sub display 122 as shown in FIG. 6, similarly to the aforementioned first embodiment. Further, no high-level control signal GATES is supplied to the gate lines of the sub display 122, whereby the gate lines of the sub display 122 remain undriven.

A high-level control signal GATEM is successively supplied to the gate lines of the main display 113, thereby successively driving the gate lines of the main display 113. Further, the transistors 15b, 15c and 15d of the HSW 15 successively enter ON-states, so that writing is performed in the dots 213a, 313a and 413a.

In order to display image data only on the sub display 122, on the other hand, the transistors 15b of the HSW 15 enter ON-states while the transistors 15c and 15d enter OFF-states, similarly to the aforementioned first embodiment. Thus, the image signals S1 to S240 are supplied to the HSW 24 through the signal lines 44, the transistors 15b and the signal lines 41, 30a and 51. No high-level control signal GATEM is supplied to the main display 113, so that the gate lines of the main display 113 remain undriven.

A high-level control signal GATES is successively supplied to the gate lines of the sub display 122, thereby successively driving the gate lines of the sub display 122. The transistors 24b, 24c and 24d of the HSW 24 successively enter ON-states, so that writing is performed in the dots 322a, 422a and 522a similarly to the aforementioned first embodiment.

In order to display image data on both of the main display 113 and the sub display 122, the aforementioned operation of displaying image data only on the main display 113 and that of displaying image data only on the sub display 122 are alternately repeated, as shown in FIGS. 6 and 7. When alternately repeating operations of performing writing in the main display 113 and in the sub display 122 every ¹/₁₂₀ seconds in this case, the liquid crystal display can let the user recognize that both of the main display 113 and the sub display 122 regularly display image data.

According to the third embodiment, as hereinabove described, the liquid crystal display is provided with the driver IC 112 outputting the control signal GATEM for controlling the gate lines of the main display 113 and the control signal GATES for controlling the gate lines of the sub display 122, whereby the structures of the main board 110 and the sub board 120 can be inhibited from complication dissimilarly to a case of providing V scanners for driving the gate lines on these board 110 and 120.

The remaining effects of the third embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while the numbers of the pixels provided on the main display and the sub display are identical to each other in each of the aforementioned first to third embodiments, the present invention is not restricted to this but the numbers of the pixels provided on the main display and the sub display may alternatively be different from each other.

While each of the aforementioned first to third embodiments is applied to the liquid crystal display employed as an exemplary display, the present invention is not restricted to this but is also applicable to another display such as an organic EL display, so far as the display comprises a plurality of display portions.

While the liquid crystal display is provided with the TFTs of low-temperature polysilicon in each of the aforementioned first and second embodiments, the present invention is not restricted to this but the liquid crystal display may alternatively be provided with TFTs of amorphous silicon or high-temperature polysilicon other than the low-temperature polysilicon. Similarly, while the liquid crystal display is provided with the TFTs of amorphous silicon in the aforementioned embodiment, the present invention is not restricted to this but the liquid crystal display may alternatively be provided with TFTs of low-temperature polysilicon or high-temperature polysilicon other than the amorphous silicon.

While the driver IC is provided on the main board in the chip-on-glass system in each of the aforementioned first to third embodiments, the present invention is not restricted to this but the driver IC may alternatively be provided on the main board in a system-on-glass system. Further alternatively, the driver IC may be provided on the FPC in a tape carrier package system.

While the signal liens 41 are connected to the signal lines 30a of the FPC 30 thereby supplying the image signals output from the driver IC to the sub display through the signal lines 41 in each of the aforementioned first to third embodiments, the present invention is not restricted to this but the signal lines 42 or 43 may alternatively be connected to the signal lines 30a of the FPC 30, thereby supplying the image signals output from the driver IC to the sub display through the signal lines 42 or 43.

While the image signals S1 to S240 are time-shared into the three types of image signals R1 to R240, G1 to G240 and B1 to B240 in each of the aforementioned first and third embodiments, the present invention is not restricted to this but the image signals may alternatively be time-shared into two or four types of image signals.

While the liquid crystal display is provided with the HSW switching the signals received from the driver IC by time sharing and supplying the switched signals to the main display in each of the aforementioned first to third embodiments, the present invention is not restricted to this but the liquid crystal display may be provided with no HSW for the main display, for directly supplying the signals output from the driver IC to the main display without time-sharing the same.

While the main display and the sub display are provided with the dots having the transistors of three terminal elements in each of the aforementioned first to third embodiments, the present invention is not restricted to this but the main display and the sub display may alternatively be provided with dots having diodes of two terminal elements.

What is claimed is:

1. A display comprising:
   a first display portion;
   a second display portion;
   a driver circuit driving said first display portion and said second display portion;
   a plurality of first signal lines supplying a signal output from said driver circuit to said first display portion while partially serving also as a signal line for supplying another signal output from said driver circuit to said second display portion;
   a first switching circuit provided on said second display portion for switching said signal for said second display portion supplied through part of said first signal lines by time sharing;
   a plurality of second signal lines for supplying said signal for said second display portion switched by said first switching circuit to said second display portion; and
   a second switching circuit provided on said first display portion for switching said signal output from said driver circuit by time sharing and supplying switched said signal to said first signal lines, wherein
   said driver circuit alternately repeats an operation of supplying said signal for said second display portion to part of said first signal lines by said second switching circuit provided on said first display portion while switching said signal for said second display portion supplied through said part of said first signal lines with said first switching circuit provided on said second display portion and supplying switched said signal to said second signal lines and another operation of switching said signal for said first display portion with said second switching circuit provided on said first display portion and supplying switched said signal to said first signal lines while turning off said first switching circuit provided on said second display portion when displaying image data on said first display portion and said second display portion.

2. The display according to claim 1, further comprising a wiring board for electrically connecting said first display portion and said second display portion with each other, wherein
   said wiring board includes a plurality of third signal lines for supplying said signal for said second display portion supplied through part of said first signal lines to said first switching circuit.

3. The display according to claim 1, wherein
   the number of signals resulting from time sharing by said first switching circuit provided on said second display portion is identical to the number of signals resulting from time sharing by said second switching circuit provided on said first display portion.

4. The display according to claim 1, wherein
   the number of signals resulting from time sharing by said first switching circuit provided on said second display portion is greater than the number of signals resulting from time sharing by said second switching circuit provided on said first display portion.

5. The display according to claim 1, further comprising:
   a plurality of fourth signal lines for supplying a signal for controlling said first switching circuit from said driver circuit to said first switching circuit, and
   a plurality of fifth signal lines for supplying another signal for controlling said second switching circuit from said driver circuit to said second switching circuit.

6. The display according to claim 1, wherein
   said driver circuit controls said second switching circuit provided on said first display portion to supply said signal for said second display portion to part of said first signal lines while controlling said first switching circuit provided on said second display portion to switch said signal for said second display portion supplied through said part of said first signal lines and to supply switched said signal to said second signal lines when displaying image data on said second display portion.

7. The display according to claim 1, wherein
said second switching circuit includes a plurality of switching portions corresponding to said plurality of first signal lines respectively, and
said driver circuit turns on only said switching portion of said second switching circuit corresponding to partial said first signal line included in said plurality of first signal lines when displaying image data on said second display portion.

8. The display according to claim 1, wherein
said driver circuit controls said second switching circuit provided on said first display portion to switch said signal for said first display portion and to supply switched said signal to said first signal lines while turning off said first switching circuit provided on said second display portion when displaying image data on said first display portion.

9. The display according to claim 1, wherein
said first display portion and said second display portion include counter electrodes for applying voltages to liquid crystals respectively, and
the display further comprises:
a first electrode control portion controlling said voltage applied to said counter electrode of said first display portion, and
a second electrode control portion controlling said voltage applied to said counter electrode of said second display portion,
so that said first electrode control portion supplies a voltage signal to corresponding said counter electrode when performing an operation of displaying image data not only on said first display portion but also on said second display portion while said second electrode control portion supplies a voltage signal to corresponding said counter electrode when performing an operation of displaying image data not only on said second display portion but also on said first display portion when displaying image data on said first display portion and said second display portion.

10. The display according to claim 1, further comprising:
a first board provided with said first display portion, and
a second board provided with said second display portion, wherein
said driver circuit is further arranged on said first board.

11. The display according to claim 10, wherein
said first signal lines are provided on said first board, while said second signal lines are provided on said second board.

12. The display according to claim 10, further comprising a coupling line provided on said second board for coupling part of said first signal lines and said second signal lines with each other through said third signal lines.

13. The display according to claim 1, wherein
said plurality of first signal lines each includes a red signal transmission line transmitting a signal corresponding to red, a green signal transmission line transmitting a signal corresponding to green and a blue signal transmission line transmitting a signal corresponding to blue, and
partial said first signal line for supplying said signal for said second display portion to said second display portion is constituted of any one of said red signal transmission line, said green signal transmission line and said blue signal transmission line.

14. The display according to claim 2, wherein
the number of said third signal lines is one third of the number of said second signal lines.

15. The display according to claim 1, further comprising:
a first gate line scanning circuit provided on said first display portion for scanning gate lines of said first display portion,
a second gate line scanning circuit provided on said second display portion for scanning gate lines of said second display portion,
a sixth signal line supplying a signal for driving said first gate line scanning circuit from said driver circuit to said first gate line scanning circuit, and
a seventh signal line supplying a signal for driving said second gate line scanning circuit from said driver circuit to said second gate line scanning circuit.

16. The display according to claim 1, further comprising:
an eighth signal line directly connected from said driver circuit to gate lines of said first display portion for supplying a signal to said gate lines of said first display portion, and
a ninth signal line directly connected from said driver circuit to gate lines of said second display portion for supplying a signal to said gate lines of said second display portion.

* * * * *